US011695568B1

(12) United States Patent
Kempf et al.

(10) Patent No.: US 11,695,568 B1
(45) Date of Patent: Jul. 4, 2023

(54) VIRTUALIZED NETWORK FUNCTIONS VERIFICATION USING DECENTRALIZED IDENTIFIERS

(71) Applicant: Equinix, Inc., Redwood City, CA (US)

(72) Inventors: James Kempf, Mountain View, CA (US); Rodney Martin Elder, Plainfield, IL (US); Milan Basnet, Santa Clara, CA (US)

(73) Assignee: EQUINIX, INC., Redwood City, CA (US)

( * ) Notice: Subject to any disclaimer, the term of this patent is extended or adjusted under 35 U.S.C. 154(b) by 361 days.

(21) Appl. No.: 17/019,001

(22) Filed: Sep. 11, 2020

Related U.S. Application Data

(60) Provisional application No. 62/908,976, filed on Oct. 1, 2019.

(51) Int. Cl.
*H04L 9/32* (2006.01)
*H04L 67/10* (2022.01)
*G06F 9/455* (2018.01)
*H04L 9/30* (2006.01)

(52) U.S. Cl.
CPC ........ *H04L 9/3247* (2013.01); *G06F 9/45558* (2013.01); *H04L 9/30* (2013.01); *H04L 9/3218* (2013.01); *H04L 9/3242* (2013.01); *H04L 67/10* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,886,267 B2 | 2/2018 | Maheshwari et al. |
| 9,948,552 B2 | 4/2018 | Teng et al. |
| 10,129,078 B2 | 11/2018 | Kumar et al. |
| 10,320,795 B2 | 6/2019 | Samuel et al. |
| 10,454,927 B2 | 10/2019 | Oberhauser et al. |
| 11,281,658 B2 | 3/2022 | Jentzsch et al. |

(Continued)

FOREIGN PATENT DOCUMENTS

| | | | |
|---|---|---|---|
| WO | 2017053048 A1 | 3/2017 | |
| WO | WO-2019179535 A2 * | 9/2019 | ......... G06Q 20/3825 |
| WO | 2019204794 A1 | 10/2019 | |

OTHER PUBLICATIONS

U.S. Appl. No. 17/112,588, filed Dec. 4, 2020, naming inventors Ansay et al.

(Continued)

*Primary Examiner* — William J. Goodchild
(74) *Attorney, Agent, or Firm* — Shumaker & Sieffert, P.A.

(57) ABSTRACT

This disclosure describes techniques for verifying virtualized network functions (VNFs) using Decentralized Identifiers (DIDs). For example, a system includes an orchestrator configured to obtain, using a Decentralized Identifier (DID) that is associated with a virtualized network function (VNF) image for a VNF, a DID document associated with the DID, verify, based on the DID document associated with the DID, the VNF image, and deploy the VNF image as a VNF instance on a Network Functions Virtualization infrastructure (NFVi). The system also includes one or more consensus networks that store the DID document associated with the VNF image in a distributed ledger.

20 Claims, 6 Drawing Sheets

(56) References Cited

U.S. PATENT DOCUMENTS

| | | | |
|---|---|---|---|
| 11,425,111 | B2 | 8/2022 | Smith et al. |
| 2008/0052698 | A1 | 2/2008 | Olson et al. |
| 2015/0249672 | A1 | 9/2015 | Burns et al. |
| 2018/0343126 | A1 | 11/2018 | Fallah et al. |
| 2018/0343164 | A1* | 11/2018 | Wylie .................. G06F 9/50 |
| 2019/0230092 | A1* | 7/2019 | Patel .................. G06F 21/33 |
| 2019/0319808 | A1 | 10/2019 | Fallah et al. |
| 2020/0036707 | A1* | 1/2020 | Callahan ............... H04L 67/53 |
| 2020/0065763 | A1 | 2/2020 | Rosinzonsky et al. |
| 2020/0349276 | A1 | 11/2020 | Murdoch et al. |

OTHER PUBLICATIONS

U.S. Appl. No. 17/100,399, filed Nov. 20, 2020, naming inventors Kempf et al.

"Ipfs/ipfs: Peer-to-Peer hypermedia protocol" GitHub, Retrieved: https://github.com/ipfs/ipfs, Accessed Apr. 14, 2021, 9 pp.

"DID Specification Registries," W3C Editor's Draft Apr. 2, 2021, Retrieved: https://w3c.github.io/did-spec-registries/#did-methods, Accessed Apr. 2, 2021, 44 pp.

Rein et al., "The Remote Attestation NFV Use Cases draft-rein-remote-attestation-nfv-use-cases-00," 2018 IETF Trust, Network Working Group: Internet Draft, Mar. 5, 2018, 11 pp.

"Network Functions Virtualisation (NFV) Release 3; Licensing Management; Report on License Management for NFV," ETSI GR NFV-EVE 010 V3.1.1, Dec. 2017, 31 pp.

"Network Functions Virtualisation (NFV)," ETSI, Retrieved Apr. 14, 2021 from: http://web.archive.org/web/20190420190232/https://www.etsi.org/technologies/nfv, Accessed Apr. 20, 2019, 18 pp.

"Home—DPDK," Linux Foundation, Retrieved Apr. 14, 2021 from: https://web.archive.org/web/20190515153922/https://www.dpdk.org/, Accessed May 15, 2019, 4 pp.

"Build the Future of Open Infrastructure," Openstack Foundation, Retrieved Apr. 14, 2021 from: https://web.archive.org/web/20190514161111/https://www.openstack.org/, Accessed May 14, 2019, 8 pp.

Reichert, "Ericsson: Expired certificate caused O2 and Softbank Outages," ZDNet, Retrieved Apr. 14, 2021 from: https://web.archive.org/web/20190524042438/https://www.zdnet.com/article/ericsson-expired-certificate-caused-o2-and-softbank-outages/, Accessed May 24, 2019, dated Dec. 6, 2018, 4 pp.

"A Primer for Decentralized Identifiers," Decentralized Identity Foundation, Retrieved Apr. 14, 2021 from: https://w3c-ccg.github.io/did-primer/, Accessed May 19, 2019, dated Dec. 29, 2020, 8 pp.

Sabadello, "A Universal Resolver for self-sovereign identifiers," Retrieved Apr. 14, 2021, from: https://medium.com/decentralized-identity/a-universal-resolver-for-self-sovereign-identifiers-48e6b4a5cc3c, Accessed May 16, 2019, dated Nov. 1, 2017, 5 pp.

"Decentralized Identifiers (DIDs) v0.12," W3C, Retrieved Apr. 14, 2021, from: http://web.archive.org/web/20190523111828/https://w3c-ccg.github.io/did-spec/, Accessed May 23, 2019, 45 pp.

"RSA Signature Suite 2018" W3C, Retrieved Apr. 14, 2021, from: https://web.archive.org/web/20190725234817/https://w3c-dvcg.github.io/lds-rsa2018/, Accessed Jul. 25, 2019, 5 pp.

"Linked Data Signatures 1.0," W3C, Retrieved Apr. 14, 2021, from: https://web.archive.org/web/20190709115729/https://w3c-dvcg.github.io/ld-signatures/, Accessed Jul. 9, 2019, 14 pp.

"Decentralized Identity: Own and control your identity," Microsoft, Retrieved Apr. 14, 2021, from: https://web.archive.org/web/20190527123600/https://query.prod.cms.rt.microsoft.com/cms/api/am/binary/RE2DjfY, Accessed May 27, 2019, 23 pp.

"Verifiable Credentials Data Model 1.0," Retrieved Apr. 14, 2021, from: https://www.w3.org/TR/vc-data-model/, Nov. 19, 2019, 122 pp.

"Sidetree Entity Protocol," Github, Retrieved Apr. 14, 2021, from: https://github.com/decentralized-identity/did-methods/blob/master/sidetrees/explainer.md, last updated Apr. 7, 2018, 10 pp.

Buchner, "The Sidetree Protocol: Scalable DPKI for Decentralized Identity," Retrieved Apr. 14, 2021, from: https://medium.com/decentralized-identity/the-sidetree-scalable-dpki-for-decentralized-identity-1a9105dfbb58, Feb. 27, 2019, 6 pp.

"Decentralized-identity/secure-data-store," Github, Retrieved Apr. 14, 2021 from: https://web.archive.org/web/20201107153954/https://github.com/decentralized-identity/secure-data-store, Accessed Nov. 7, 2020, 2 pp.

"Decentralized Identifiers (DIDs) v0.13: Data Model and Syntaxes," W3C, Retrieved Apr. 14, 2021, from: https://web.archive.org/web/20190619085145/https://w3c-ccg.github.io/did-spec/, Accessed Jun. 19, 2019, 45 pp.

Wright et al., "JSON Schema: A Media Type for Describing JSON Documents: draft-handrews-json-schema-02," Internet Engineering Task Force: Internet-Draft, Sep. 16, 2019, 75 pp.

Roman et al., "On the features and challenges of security and privacy in distributed internet of things," Computer Networks, vol. 57, Issue 10, Jul. 5, 2013, 14 pp.

Alzahrani et al., "An Informative-Centric Networking Based Registry for Decentralized Identifiers and Verifiable Credentials," IEEE Access, Jul. 24, 2020, pp. 137198-137208.

Luecking et al., "Decentralized identity and trust management framework for Internet of Things," 2020 IEEE International Conference on Blockchain and Cryptocurrency (ICBC), May 2020, 9 pp.

* cited by examiner

US 11,695,568 B1

VIRTUALIZED NETWORK FUNCTIONS VERIFICATION USING DECENTRALIZED IDENTIFIERS

This application claims the benefit of U.S. Provisional Application No. 62/908,976 filed Oct. 1, 2019, the entire content of which is incorporated by reference.

TECHNICAL FIELD

In general, this disclosure relates to computer networks, and more particularly, to validating virtualized network functions.

BACKGROUND

A Network Functions Virtualization (NFV) architecture includes multiple virtualized network functions (VNFs). A network operator may deploy NFV Infrastructure (NFVI) in the form of one or more computing devices to apply, to data traffic traversing a computer network, network services such as firewall, carrier grade network address translation (CG-NAT), performance enhancement proxies for video, transport control protocol (TCP) optimization and header enrichment, caching, and load balancing. Each of these network services may be referred to as a network function and may be performed by a virtualized network function, which may be executed by one or more virtual machines, containers, or other execution environment of the NFV Infrastructure. In this way, virtualized network functions may be executed by servers, switches, storage devices, and cloud computing infrastructure, instead of having custom hardware appliances for each network function.

SUMMARY

This disclosure describes techniques for verifying virtualized network functions (VNFs) using Decentralized Identifiers (DIDs). DIDs are based on a distributed ledger technology such as blockchain (e.g., the technology underlying various cryptocurrencies, such as Ethereum and Bitcoin). In one example implementation, the techniques provide generating a DID for a VNF image and VNF instance, for the secure deployment of the VNF. DIDs may be used to obtain (i.e., "resolve") a DID document associated with the DID that contains information for cryptographically verifying the integrity of a VNF image or VNF instance identified by the DID and, in some cases, to obtain a license for deploying the VNF image. In some examples, the DID document includes public keys, authentication protocols, and service endpoints (e.g., a location or link to a service to obtain a license), and image verifiers for a VNF image.

The techniques described in this disclosure may provide one or more technical advantages for realizing at least one practical application. For example, by assigning DIDs for verifying VNF types and VNF instances, VNF software tenants and network operators may authenticate VNF images and VNF instances to facilitate the trust relationship between a network service orchestrator (NSO) and the VNF image, as well as the trust relationship between VNF instances and the tenants requesting the VNF instances. Such applications are generally unavailable when universal unique identifiers (UUIDs) are used for verifying VNF instances. That is, tenants may prove that a created VNF instance is in fact the VNF instance that was ordered, and the network operator may prove that the VNF image originates with the VNF provider and is otherwise authentic. Moreover, the techniques may in some examples provide the tenants with a way to dynamically obtain a license for VNF instances without having to install a license server.

In one example of the techniques described in this disclosure, a system includes an orchestrator configured to obtain, using a Decentralized Identifier (DID) that is associated with a virtualized network function (VNF) image for a VNF, a DID document associated with the DID, verify, based on the DID document associated with the DID, the VNF image, and deploy, in response to verifying the VNF image, the VNF image as a VNF instance on a Network Functions Virtualization infrastructure (NFVi). The system also includes the NFVi, wherein the NFVi comprises one or more computing devices to implement the VNF image.

In another example of the techniques described in this disclosure, a method includes obtaining, by an orchestrator using a Decentralized Identifier (DID) that is associated with a virtualized network function (VNF) image for a VNF, a DID document associated with the DID, wherein the DID document is stored in a distributed ledger of one or more consensus networks. The method also includes verifying, by the orchestrator and based on the DID document associated with the DID, the VNF image. The method further includes deploying, in response to verifying the VNF image, the VNF image as a VNF instance on a Network Functions Virtualization infrastructure (NFVi).

In another example of the techniques described in this disclosure, a device configured to operate as an orchestrator including a memory; and processing circuitry in communication with the memory, the processing circuitry being configured to: obtain, using a Decentralized Identifier (DID) that is associated with a virtualized network function (VNF) image for a VNF, a DID document associated with the DID, wherein the DID document is stored in a distributed ledger of one or more consensus networks; verify, based on the DID document associated with the DID, the VNF image; and deploy, in response to verifying the VNF image, the VNF image as a VNF instance on a Network Functions Virtualization infrastructure (NFVi).

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
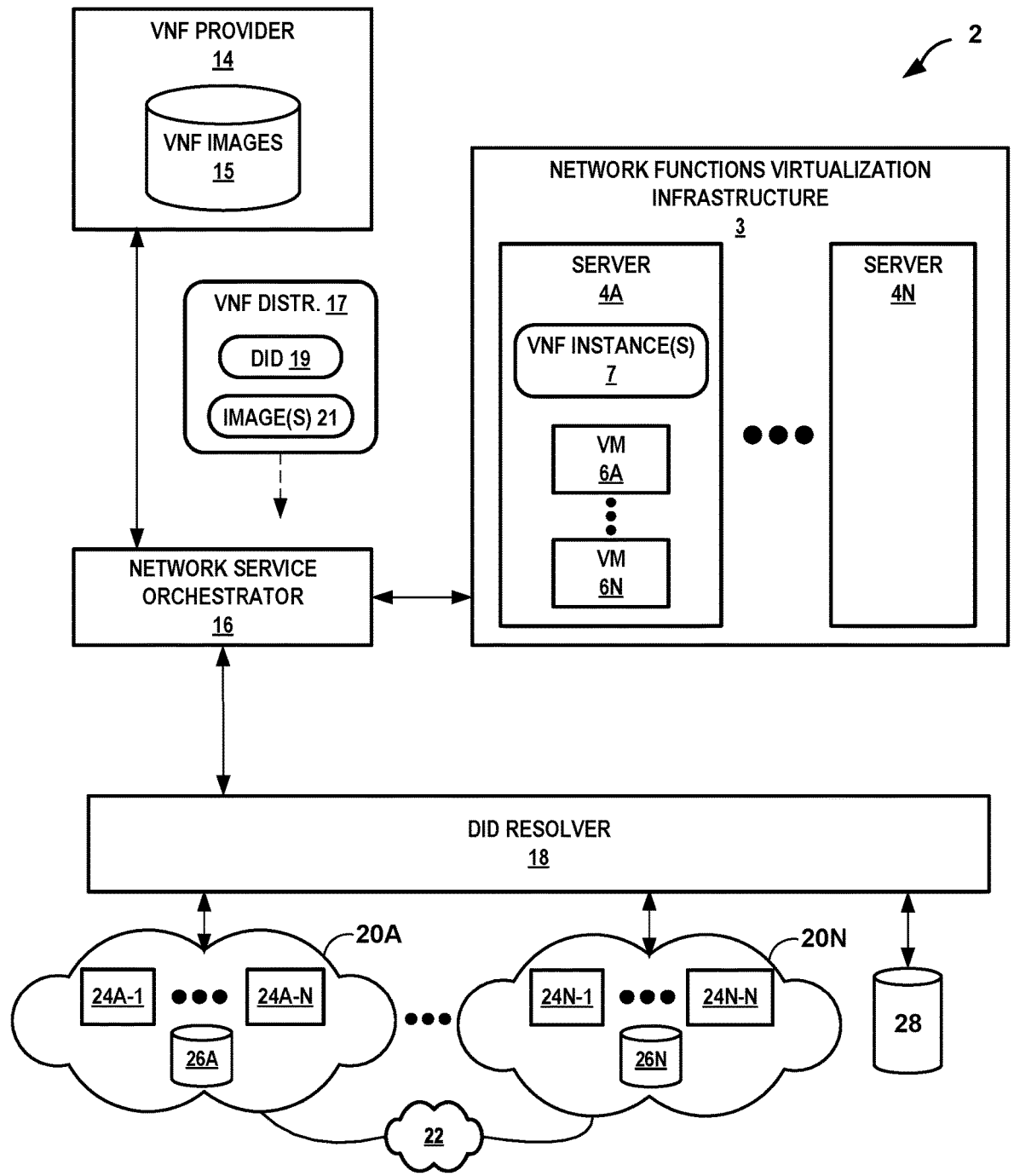
FIG. 1 is a conceptual diagram illustrating a system for verifying Virtualized Network Functions using Decentralized Identifiers, in accordance with one or more aspects of the techniques described in this disclosure.

FIG. 1 is a conceptual diagram illustrating a system 2 for verifying Virtualized Network Functions using Decentralized Identifiers (DIDs), in accordance with one or more aspects of the techniques described in this disclosure. In the example of FIG. 1, system 2 includes Network Functions Virtualization infrastructure (NFVi) 3 to deploy one or more services, such as Virtualized Network Functions (VNFs). VNFs provide similar functionality to hardware-based network devices, (e.g., routers, switches, firewalls, etc.), but in software. NFVi 3 includes computing hardware, storage hardware, and network hardware for executing VNFs. In some examples, NFVi 3 further includes a virtualization layer over the hardware to offer virtual computing, virtual storage, and virtual network for executing VNFs. NFVi 3 may be executed by one or more computing devices in a centralized or distributed manner. In the example of FIG. 1, NFVi 3 includes servers, e.g., servers 4A-4N, running hypervisors, on which VNF images (including the network infrastructure software) are deployed. Each of servers 4 may provide one or more virtual instances 7, such as virtual machines 6A-6N (collectively, "VMs 6"). Each of VMs 6 emulates virtual hardware. In other words, each of VMs 6 provides a virtualized operating system and application suite (e.g., to deploy VNFs) for customer access. Alternatively, or additionally, each of servers 4 may provide containers (e.g., such as those provided by the open source Docker Container application), or other virtual execution environments in which VNFs are implemented.

In the example of FIG. 1, system 2 includes multiple consensus networks, including consensus network 20A through consensus network 20N (collectively, "consensus networks 20") that each includes one or more distributed ledgers 26. Consensus networks 20 are communicatively connected via network 22. Network 22 may be part of a public network, such as the Internet. Each of consensus networks 20 includes a plurality of nodes. For instance, consensus network 20A includes nodes 24A-1 through 24A-N (collectively "nodes 24A"), which may represent any number of nodes. Similarly, consensus network 20N includes nodes 24N-1 through node 24N-N (collectively "nodes 24N"), which, again, may represent any number of nodes. Each of nodes 24A-1 through 24A-N (shown within consensus network 20A) and each of nodes 24N-1 through 24N-N (shown within consensus network 20B) may be implemented as any suitable computing system, such as one or more server computers, workstations, mainframes, appliances, cloud computing systems, and/or other computing systems that may be capable of performing operations and/or functions described in accordance with one or more aspects of the present disclosure. One or more of nodes 24A and/or nodes 24N may, in some examples, represent a cloud computing system, server farm, and/or server cluster (or portion thereof) that provides services to client devices and other devices or systems. In other examples, nodes 24A and nodes 24N may represent or be implemented through one or more virtualized compute instances (e.g., virtual machines, containers) of a data center, cloud computing system, server farm, and/or server cluster. For instance, any or all of nodes 24A or nodes 24N may be implemented as Ethereum (or other blockchain) virtual machines.

As described above, each of consensus networks 20 implements one or more distributed ledgers. In the example shown, consensus network 24A includes distributed ledger 26A that implements a blockchain (e.g., the technology underlying various cryptocurrencies, such as Ethereum, Sovrin, and Bitcoin) or decentralized, content-addressable data store such as InterPlanetary File System (IPFS). Distributed ledger 26A may be implemented as a data store included in multiple (or all) nodes 24A within consensus network 20A. Consensus networks 20 (that is, the remainder of the consensus networks through consensus network 20N) may be implemented in a similar manner, so that each of consensus networks 20 includes one or more distributed ledgers 26 (e.g., consensus network 20N includes distributed ledger 26N). In general, each node within a respective consensus network 20 (or a significant fraction of the nodes) includes a copy (or at least a partial copy) of the distributed ledgers maintained by the respective consensus network 20.

Each of distributed ledgers 26 (i.e., included within each of consensus networks 20) may be shared transactional databases or data stores that include a plurality of blocks, each block (other than the root) referencing at least one block created at an earlier time, each block bundling one or more transactions registered within distributed legers 26, and each block cryptographically secured. Each of consensus networks 20 may receive transactions from transaction senders (e.g., computing devices external or internal to each of consensus networks 20) that invoke functionality of distributed ledgers 26 to modify a given distributed ledger 26 stored within a consensus network. Each of consensus networks 20 uses the distributed ledger 26 stored within the consensus network for verification. Each block of a distributed ledger typically contains a hash pointer as a link to a previous block, a timestamp, and the transaction data for the transactions. By design, distributed ledgers 26 are inherently resistant to modification of previously-stored transaction data. Functionally, each of distributed ledgers 26 serves as a ledger, distributed across many nodes of a consensus network, that can record transactions between parties efficiently and in a verifiable and permanent way.

Nodes 24 of each of consensus networks 20 implement one or more distributed ledgers 26. Each of consensus networks 20 may be a peer-to-peer network that manages one or more distributed ledgers 26 by collectively adhering to a consensus protocol and/or performing operations corresponding to various device identification-related or network-compliance-related rules set. Nodes 24 adhere to the protocol and/or rules for validating new blocks. Once recorded, the data in any given block of distributed ledgers 26 cannot be altered retroactively without the alteration of all subsequent blocks and a collusion of at least some (e.g., typically a majority) of nodes 24 of the particular consensus network. For instance, with reference to consensus network 20A, the data in a block within distributed ledger 26 cannot be altered retroactively without also altering all subsequent blocks without agreement of a majority of nodes 24 of consensus network 20A.

One or more of consensus networks 20 may, for instance, represent an Ethereum network, Sovrin network, Bitcoin network, or other blockchain network. Additional information regarding distributed ledgers is described in U.S. patent application Ser. No. 16/453,606, entitled "SMART CON- TRACT INTERPRETER," filed Jun. 26, 2019, the entire contents of which is incorporated by reference herein.

Alternatively, or additionally, system 2 includes a decentralized, content-addressable data store 28 ("decentralized data store 28"), such as IPFS. Decentralized data store 28 is a decentralized file system in which operators hold a portion of the overall data. Additional examples of a decentralized, content-addressable data store, such as IPFS, is described in the IPFS section in github, the entire contents of which is incorporated by reference herein.

VNFs are often proprietary, licensed software packages from third parties, such as VNF providers. VNF providers, e.g., VNF providers 14, typically track deployments of VNFs such that proper licensing fees can be paid. For example, VNF types are typically identified using a code assigned by the VNF provider. During deployment, when the VNF type is selected (e.g., a virtual router with a specific number of ports), the VNF type code is sent to a network service orchestrator, which typically assigns a universal unique identifier (UUID) to the VNF instance. Tenants then use the UUID to refer to the VNF instance. However, the process of verifying the VNF instance using UUID is fragmented, which requires the network service orchestrator to keep track of multiple pieces of information. Moreover, the trust relationship of the network service orchestrator and the VNF image (as well as the relationship between the VNF instance and tenant) is also fragmented. For example, the tenant has no proof that the VNF instance installed is actually the VNF instance that was ordered. The network operator also has no proof that the VNF image originates with the VNF provider. In some cases, the VNF provider may provide a public key certificate to prove providence, but certificates are subject to a variety of issues, such as expiration and revocation. For example, when VNF providers fail to renew expired certificates, this causes problems with installation and use of the virtualized network functions.

In accordance with the techniques disclosed herein, system 2 provides verification of Virtualized Network Functions using Decentralized Identifiers (DIDs). DIDs are based on a distributed ledger technology such as blockchain (implemented by distributed ledger 26A) and/or decentralized, content-addressable data store 28 such as InterPlanetary File System (IPFS). DIDs are a class of Universal Resource Names (URNs) that are cryptographically verifiable and reside in cryptographically secure, distributed ledgers, e.g., distributed ledgers 26. DIDs do not require a centralized registry, identity provider, or certificate authority. Instead, DIDs are registered with one or more of distributed ledgers 26.

In the example of FIG. 1, system 2 includes an network service orchestrator 16 that handles tenant requests for deployment of VNFs. For example, network service orchestrator 16 may organize, direct and integrate underlying microservices through VMs 6 (or containers), as well as other software and network sub-systems, for managing various services (e.g., deployment of VNFs). In response to a user or tenant request for one or more VNFs, network service orchestrator 16 may request for a VNF distribution including one or more VNF images 15 from VNF provider 14.

Network service orchestrator 16 may receive VNF distribution 17 including one or more VNF images 21 (e.g., executable image files) from VNF provider 14. Each of the VNF images 21 may specify a VNF to be deployed in one or more of VMs 6. Each of the VNF images 21 of VNF distribution 17 may be associated with DID 19. In some examples, DID 19 may have a Universal Resource Name (URN) format as shown below:

did:method:123abc

The initial "did" field identifies the URN as belonging to a decentralized identifier scheme. The "method" field identifies the DID method used to define the DID and to identify a DID document type. For example, DID methods may include Sovrin (e.g., "sov"), Bitcoin (e.g., "btu"), IPFS (e.g., "ipid"), and other consensus networks and/or decentralized, content addressable data stores. Additional examples of DID methods are further described in Draft Community Group Report 10 Jun. 2019, Credentials Community Group (W3C), the entire contents of which is incorporated by reference herein. The "123abc" is the actual unique identifier associated with one or more VNF images (e.g., VNF images 21) provided by VNF provider 14 (e.g., a manufacturer or seller of VNFs). In some examples, a DID is typically generated by taking a hash of a public key or a hash of a DID document associated with the DID.

A DID is associated with a DID document that contains information for cryptographically verifying the identity of one or more VNF images associated with the DID (e.g., VNF images 21 associated with DID 19) and, in accordance with the techniques described in this disclosure, is used to obtain a license for deploying the VNF images. In the example of FIG. 1, DID documents may be stored within distributed ledgers 26 and/or decentralized data store 28. For example, DID documents may be registered within distributed ledgers 26 based on the DID method (e.g., Sovrin). As described above, a plurality of blocks of distributed ledgers 26 are stored in a data store included in multiple (or all) nodes 24. Each block bundles one or more transactions registered (e.g., creation of DID document) within distributed ledgers 26, and each block is cryptographically secured.

In some examples, a DID document is a JavaScript Object Notation for Linked Data (JSON-LD) document. As further described below, a DID document may specify public keys, authentication protocols, service locations (otherwise referred to herein as "service endpoints"), and VNF image verification information (otherwise referred to herein as "VNF image verifiers" or "VNF image verifier records") for the VNF images 21. In some examples, the DID document may include other properties, such as a proof property that is a cryptographic proof of the integrity of the DID document (e.g., that the DID document has not been tampered with).

The public key information of a DID document is used for digital signatures of VNF images (referred to herein as "image signatures"), encryption and other cryptographic operations for authenticating or establishing a secure communication with service endpoints specified in the DID document. An example of the public key information is shown below:

"publicKey": [{
"id": "did:method:123abc#keys–1",
"type": "RsaVerificationKey2018",
"controller": "did:method:123abc",
"publicKeyPem": "—BEGIN PUBLIC KEY . . . END PUBLIC KEY—\R\n"
}]

In this example, the "publcKey" information of a DID document includes an "id" property that identifies the key for the DID. The public key information includes a "type" property of the public key, such as a Rivest-Sharmi-Adleman (RSA) verification key from the RSA 2018 verification suite that supports DIDs or other verification techniques that support DIDs. Other types of public keys include Digital Signature Algorithm (DSA), Elliptic Curve Digital Signature Algorithm (ECDSA), or other public key cryptography algorithms that support DIDs. The public key information includes a "controller" property that identifies the entity (or group of entities) in control of the DID and/or DID document. The public key information also includes a one or more public key properties, such as a file format of the public key. For example, public key properties may include Privacy Enhanced Mail (PEM) format (e.g., "publicKeyPem"), a JSON web Key (JWK) format (e.g., "publicKeyJwk"), hexadecimal (HEX) format (e.g., "publicKeyHex"), Base64 format (e.g., "publicKeyBase64"), Base58 format (e.g., "publicKeyBase58"), multibase format (e.g., "publicKeyMultibase") and Ethereum format (e.g., "ethereumAddress").

The authentication information of the DID document may specify the authentication method by which the controller of the DID can cryptographically prove the controller is associated with the DID. An example of the authentication information is shown below:

"authentication": [
// this method can be used to authenticate as did: . . . abc
  "did:method:123abc#keys–1"
]

In the above example, the public key, "did:method:123abc#keys–1" may be used to authenticate the DID document that is associated with the DID, "did:method:123abc."

In some examples, the DID document may also include a proof property that is a cryptographic proof of the integrity of the DID document (e.g., that the DID document has not been tampered with). An example of the proof property is shown below:

"proof": {
"type": "LinkedDataSignature2015",
"created": "2016-02-08T16:02:20Z",
"creator": "did:method:8uQhQMGzWxR9vw5P3UWH1ja#fkeys–1",
"signatureValue": "QNB13U7Q9 . . . 1tzjn4w=="
}

In the example proof property above, the "type" property refers to one of the Linked Data standard mechanisms for verifying the integrity of a linked document. Other proof mechanisms may include JSON Web Tokens (as described in Request for Comments (RFC) 7519), JSON Web Tokens secured using JSON Web Signatures (as described in RFC 7515), and Camenisch-Lysyanskaya Zero-Knowledge Proofs. The "created" property specifies a timestamp of when the DID document was created. The "creator" property refers back to the public key used to verify the signature, and the "signatureValue" property is the actual signature of the DID document itself, created according to the proof mechanism, e.g., Linked Data standard identified in the "type" property.

A DID document associated with DID 19 may also include one or more service locations by which network service orchestrator 16 may obtain a license for VNF images 21. For example, a DID document includes service endpoints that may represent any type of service for the entity that the DID document is about (referred to as "DID subject"). In accordance with one or more aspects of the disclosure, a service location may further include a VNF image verification section that contains an image signature of the VNF image calculated according to a verification method. An example of the service endpoint property including VNF image verification section, is shown below:

"service": [{
"id": "did:method:123abc#vnf-license",
"type": "AcmeRouterVNFLicenseService",
"serviceEndpoint": "acme-routers.comnicense/123abc"
"imageVerifiers": [{
  "id": "did:method:123abc#image-signature#1,
  "type": <Linked Data verification method name>,
  "publicKey": "did:method:123abc#keys–1",
  "imageSignature": <base 64 encoded signature of image hash>
  }]
}

The "id" property of the service endpoint specifies an identifier, e.g., "vnf-license," for the license service. For example, the identifier for the license service may be formulated as a fragment Uniform Resource Identifier (URI) that specifies the DID as the URI with a fragment identifier (e.g., "#vnd-license"). The "type" property of the service endpoint specifies the type of service (e.g., a VNF licensing service run by the Acme Router company in this case) for the DID. The "serviceEndpoint" property specifies a Uniform Resource Locator (URL) or other reference that can be used to obtain a license for VNF images 21 from VNF provider 14. In some examples, the service endpoint URL or other reference includes the DID associated with the VNF image to allow VNF provider 14 to maintain a collection of licenses sorted by VNF type. The "imageVerifiers" property of the service endpoint is an array of VNF image verifier records for the one or more VNF images 21 included in VNF distribution 17. If VNF distribution 17 includes a single VNF image, the imageVerifiers property will have a single VNF image verifier record. If VNF distribution 17 includes multiple VNF images, the imageVerifiers property includes a corresponding VNF image verifier record for each VNF image in VNF distribution 17. Each VNF image verifier record has an "id" property (referred to herein as "image verifier identifier"), which, in some examples, is includes a fragment URI specifying the DID as the URI and a fragment identifier (e.g., "image-signature#<array index>") with the image signature and a number identifying an index of the VNF image verifier record in an array of VNF image verifier records (e.g., the first image verifier in this example). The "type" property of the respective VNF image verifier record specifies the type of verification method (e.g., Linked Data verification method) used to calculate the image signature. The "publicKey" property of the respective VNF image verifier record points to the public key specified in the "publicKey" information of the DID document. The "publicKey" property is a fragment identifier referring to a VNF image verifier record in the "publicKey" property value in the DID document, wherein the public key for verifying the signature is located. The "publicKey" property is used with the verification method to decrypt the image signature, e.g., imageSignature property in the DID document (referred to herein as "image verifier hash"). The "imageSignature" property of the VNF image verifier record contains an encoded image signature (e.g., a base 64 encoded signature) of the hash of the VNF image that is encrypted with a private key using the algorithm specified in the "type" property. In some examples, the license endpoint information may include one or more additional properties, such as the cost of a transaction.

In some examples in which network service orchestrator 16 receives VNF distribution 17 including a plurality of VNF images 21 (otherwise referred to herein as "VNF image records"), the VNF distribution includes a DID 19 for the entire VNF distribution 17 and an identifier (e.g., a fragment URI) for each of the plurality of VNF images 21 in VNF distribution 17 (referred to herein as "VNF image identifiers"). The VNF image identifiers include a URI specifying the DID for the DID document and a fragment identifier, e.g., "image-signature#<record number>", where <record number> is the index of the VNF image verifier record in the "imageVerifiers" array of the DID document.

When network service orchestrator 16 receives DID 19 from VNF distribution 17, network service orchestrator 16 sends the DID 19 to DID resolver 18 to resolve the DID 19 to an associated DID document stored in distributed ledgers 26 or decentralized data store 28. DID resolver 18 may include plug-ins (e.g., DID drivers) for one or more of the DID methods as described above to lookup and resolve DIDs to associated DID documents stored in distributed ledgers 26. For example, DID resolver 18 may return to network service orchestrator 16 a URL or other reference to a DID document stored in a data store, such as an identity hub (e.g., Decentralized Identity Foundation (DIF)), run by VNF provider 14.

In response to obtaining the DID document associated with the DID, network service orchestrator 16 may verify the VNF images 21 of VNF distribution 17. For example, network service orchestrator 16 may read the network address from the data store and verify the authenticity of the DID document using, for example, the "proof" property of the DID document. For example, network service orchestrator 16 may authenticate the DID document using the type property, a timestamp of when the DID document was created (e.g., created property), a creator property specifying the public key used to verify the signature, and an image signature of the DID document (e.g., signatureValue property).

Network service orchestrator 16 may determine if the VNF distribution is bad. For example, network service orchestrator 16 may determine whether there is exactly one "imageVerifiers" record in the DID document, where the image verifiers identifier (e.g. id property of "imageVerifiers" record) matches the VNF image identifier (e.g. id property of VNF image record of VNF distribution 17). If the identifiers do not match, then the VNF distribution is bad and is reported. If there is at least one matching identifier, network service orchestrator 16 checks each VNF image record in VNF distribution 17 whether the VNF images are bad. For example, network service orchestrator 16 extracts a corresponding VNF image record with a matching identifier (e.g., id property) from an "imageVerifiers" array of the DID document and uses the signature algorithm (e.g., as specified in the "type" property of the "imageVerifiers" record and the public key pointed by the fragment URI in the "publicKey" property from the "imageVerifiers" record to verify the digital signature of the corresponding VNF image in the VNF distribution. If the digital signature does not verify, network service orchestrator 16 reports the corresponding VNF image as bad. If the digital signature is verified, network service orchestrator 16 accepts the corresponding VNF image for deployment.

If one or more of the VNF images 21 of the VNF distribution 17 is verified, network service orchestrator 16 allows the deployment of the one or more VNF images 21 from the VNF distribution 17. Network service orchestrator 16 may request a license for the VNF images from a license server of VNF provider 14 using the URL or other reference specified in the "serviceEndpoint" property to obtain and install the license for the one or more VNF images 21 of VNF distribution 17.

In some examples, the verification process described above may occur during the VNF orchestration or boot process of the NFVi. For example, prior to deploying and causing to execute a VM containing a VNF on a hypervisor of an NFVi server, network service orchestrator 16 may check the integrity of the VNF image or VNF instance using the verification process described herein. In some examples in which the distribution is packaged as a container, the container orchestration system may verify the VNF image.

Figure 2:
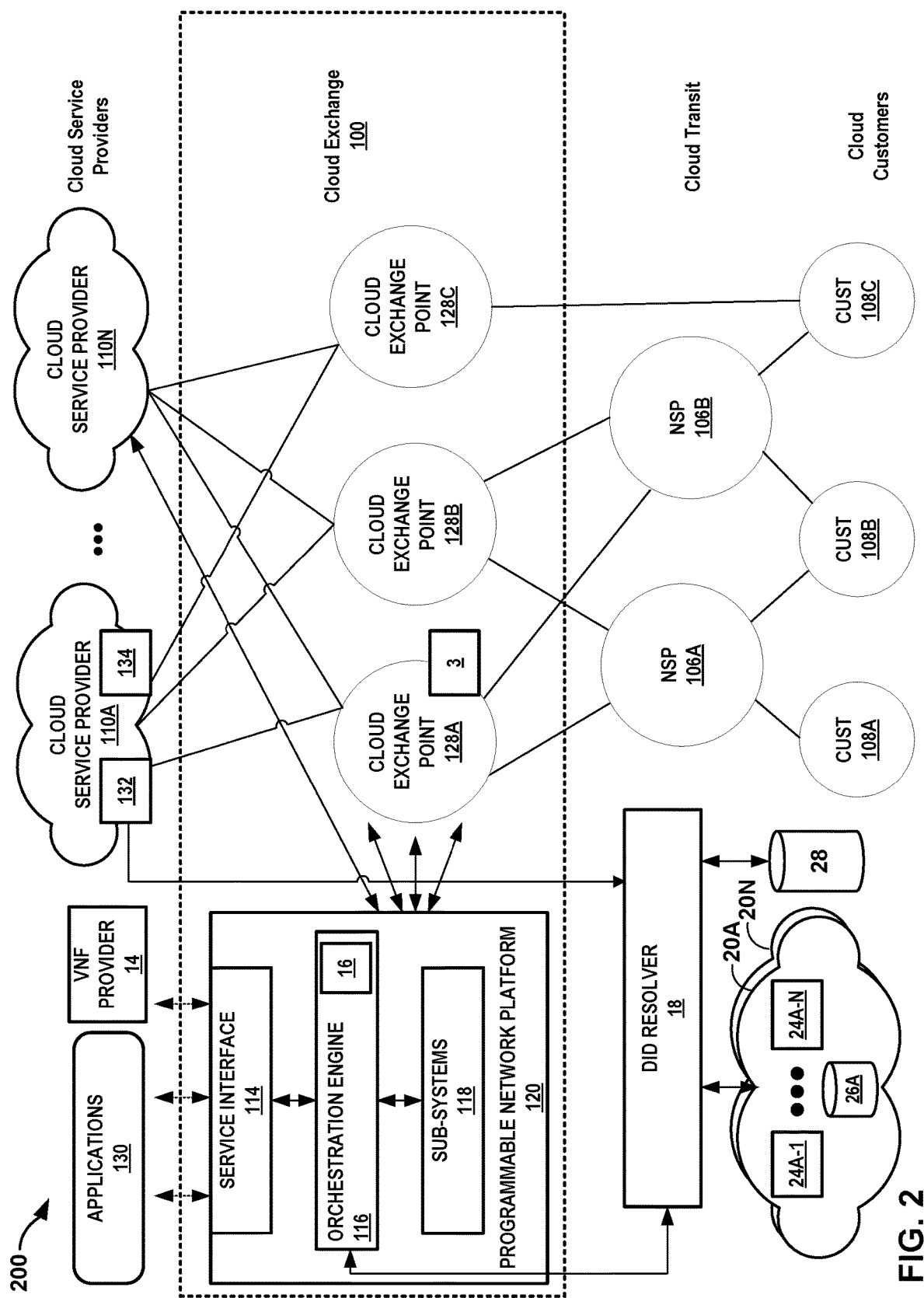
FIG. 2 is a conceptual diagram illustrating an example implementation of the system for verifying Virtualized Network Functions using Decentralized Identifiers, in accordance with one or more aspects of the techniques described in this disclosure.

FIG. 2 is a conceptual diagram illustrating an example implementation of the system for verifying Virtualized Network Functions using Decentralized Identifiers, in accordance with one or more aspects of the techniques described in this disclosure. In the example of FIG. 2, an interconnection facility provider ("provider") employs network infrastructure within an interconnection facility, e.g., cloud-based services exchange 100 ("cloud exchange 100"), that enables computing devices of customers 108A-108C ("customers 108") to connect, using interconnections established within the network infrastructure by the provider, to cloud service providers (CSPs) 110A-110N (collectively, "CSPs 110"). For example, cloud exchange 100 may provide data transport services to one or more cloud-based services. Cloud exchange 100 in this way offers customers of the cloud exchange with connectivity to a vibrant ecosystem of additional customers of the cloud exchange, including content providers, network service providers, carriers, and enterprises. Customers of cloud exchange 100 may connect for such end-uses as service delivery, content delivery, financial services, and Internet access, to give a few examples.

In this example, cloud exchange 100 may enable customers 108 to bypass the public Internet to directly connect to CSPs 110 so as to improve performance, reduce costs, increase the security and privacy of the connections, and leverage cloud computing for additional applications or services. CSPs 110 participate in the cloud exchange by virtue of their having at least one accessible port in cloud exchange 100 by which a customer can connect to the one or more applications or services offered by CSPs 110, respectively. Cloud exchange 100 may allow private networks of any customer of the cloud exchange to be directly cross-connected to any other customer at a common point, thereby allowing direct exchange of network traffic between the networks of the customers. Customers may include network service providers (NSPs) 106A-106B (collectively, "NSPs 106," or alternatively, "carriers 106"), enterprises, and other users of services offered by one or more cloud service providers.

Cloud exchange 100 includes cloud-based services exchange points 128A-128C (described hereinafter as "cloud exchange points" and collectively referred to as "cloud exchange points 128") that each represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers (e.g., customers 108) and cloud-based service providers (e.g., CSPs 110) connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchange 100 in multiple different metropolitan areas, each instance of cloud exchange 100 having one or more cloud exchange points 128.

Each of cloud exchange points 128 includes network infrastructure and an operating environment by which customers 108 receive cloud services from one or more CSPs 110. For example, cloud exchange points 128 may include Network Functions Virtualization infrastructure 3 (e.g., similarly as described in FIG. 1) that includes servers running hypervisors, on which VNF images (including the network infrastructure software) are deployed. Each of the servers may execute one or more virtual instances, such as virtual machines that provide a virtualized operating system and may execute VNFs. Alternatively, or additionally, each of NFVi 3 may provide containers (e.g., such as those provided by the open source Docker Container application), or other virtual execution environments in which VNFs are implemented.

Customers 108 may be computing devices of corresponding customer networks co-located within the corresponding data center of one of cloud exchange points 128, or customer networks that receive services via transit NSPs 106, as illustrated in FIG. 1. Cloud exchange 100 provides customers of the exchange with secure, private, virtual connections to multiple cloud service providers (CSPs) globally.

Computing devices of customers 108 may receive cloud-based services directly via a layer 3 peering and physical connection to one of cloud exchange points 128 or indirectly via one of NSPs 106. NSPs 106 provide "cloud transit" by maintaining a physical presence within one or more of cloud exchange points 128 and aggregating layer 3 access from one or more devices 108. NSPs 106 may peer, at layer 3, directly with one or more cloud exchange points 128 and in so doing offer indirect layer 3 connectivity and peering to one or more customer devices 108 by which customers (e.g., operating devices 108) may obtain cloud services from the cloud exchange 100.

As examples of the above, one customer may have contracted with a cloud exchange provider for cloud exchange 100 to directly access layer 3 cloud services via cloud exchange points 128C. In this way, that customer receives redundant layer 3 connectivity to cloud service provider 110A, for instance. The device of customer 108C, in contrast, is illustrated as having contracted with the cloud exchange provider for cloud exchange 100 to directly access layer 3 cloud services via cloud exchange point 128C and also to have contracted with NSP 106B to access layer 3 cloud services via a transit network of the NSP 106B. A customer at device 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure (e.g., as illustrated and described in FIG. 3 below) of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer networks, all having at least one port offering connectivity within one or more of the cloud exchange points 128.

In some examples, cloud exchange 100 allows a corresponding one of customers of any NSP 106 or other cloud customers including a device of customer 108C to be directly connected, via a virtual layer 2 (L2) or layer 3 (L3) connection to any other customer network and/or to any of CSPs 110, thereby allowing direct exchange of network traffic among the customer networks and CSPs 110. The virtual L2 or L3 connection may be referred to as a "virtual circuit."

In this way, cloud exchange 100 streamlines and simplifies the process of partnering CSPs 110 and customers 108 (via NSPs 106 or directly) in a transparent and neutral manner. One example application of cloud exchange 100 is a co-location and interconnection data center in which CSPs 110 and NSPs 106 and/or devices of customers 108 may already have network presence, such as by having one or more accessible ports available for interconnection within the data center, which may represent any of cloud exchange points 128. This allows the participating NSPs, customers, and CSPs to have a wide range of interconnectivity options within the same facility. A carrier/customer may in this way have options to create many-to-many interconnections with only a one-time hook up to one or more cloud exchange points 128. In other words, instead of having to establish separate connections across transit networks to access different cloud service providers or different cloud services of one or more cloud service providers, cloud exchange 100 allows customers to interconnect to multiple CSPs and cloud services.

Cloud exchange 100 includes a programmable network platform 120 ("PNP 120") for dynamically programming cloud exchange 100 to responsively and assuredly fulfill service requests that encapsulate business requirements for services provided by cloud exchange 100 and/or cloud service providers 110 coupled to the cloud exchange 100. The programmable network platform 120 may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud service provider that administers the cloud exchange 100 to dynamically configure and manage the cloud exchange 100 to, for instance, facilitate virtual connections for cloud-based services delivery from multiple cloud service providers 110 to one or more cloud customers operating devices 108. The cloud exchange 100 may enable cloud customers to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 120 enables the cloud service provider to configure cloud exchange 100 with a L3 instance requested by a cloud customer operating device 108, as described herein. A customer may request an L3 instance to link multiple cloud service providers by the L3 instance, for example (e.g., for transferring the customer's data between two cloud service providers, or for obtaining a mesh of services from multiple cloud service providers).

Programmable network platform 120 may represent an application executing within one or more data centers of the cloud exchange 100 or alternatively, off-site at a back office or branch of the cloud provider (for instance). Programmable network platform 120 may be distributed in whole or in part among the data centers, each data center associated with a different cloud exchange point 128 to make up the cloud exchange 100. Although shown as administering a single cloud exchange 100, programmable network platform 120 may control service provisioning for multiple different cloud exchanges. Alternatively, or additionally, multiple separate instances of the programmable network platform 120 may control service provisioning for respective multiple different cloud exchanges.

In the illustrated example, programmable network platform 120 includes a service interface (or "service API") 114 that defines the methods, fields, and/or other software primitives by which applications 130 may invoke the programmable network platform 120. The service interface 114 may allow carriers 106, customers, cloud service providers 110, and/or the cloud exchange provider programmable access to capabilities and assets of the cloud exchange 100 according to techniques described herein. For example, the service interface 114 may facilitate machine-to-machine communication to enable dynamic provisioning of virtual circuits in the cloud exchange for interconnecting customer and/or cloud service provider networks. In this way, the programmable network platform 120 enables the automation of aspects of cloud services provisioning. For example, the service interface 114 may provide an automated and seamless way for customers to establish, de-install and manage interconnections among multiple, different cloud providers participating in the cloud exchange.

Applications 130 represent at least one application that communicates with PNP 120 to request services for a customer. Applications 130 represent client-side software for interfacing with PNP 120 and may include a customer portal, customer applications, and/or a console such as a command-line interface or graphical user interface. Users or clients of applications 130 may include customers associated with customers 108, e.g., enterprise customers, cloud service and NSPs, or other customers of cloud exchange 100. Users of applications 130 may also include operators/administrators of the cloud exchange provider. In some examples, applications 130 and PNP 120 may represent different functions or modules of the same application.

In this example, programmable network platform 120 includes orchestration engine 116 that organizes, directs and integrates underlying software sub-systems 118 for managing various aspects of interconnection. Orchestration engine 116 may, for example, provide a rule-driven workflow engine that operates between service interface 114 and the underlying interconnection platform of cloud exchange 100 that includes sub-systems 118. In this way, orchestration engine 16 can be used by customer-proprietary applications and service interface 114 for direct participation with the interconnection platform of cloud exchange 100. In other words, orchestration engine 16 offers a "cloud exchange platform service" having various application engines or workflows to handle the service requests.

As described in further detail below, sub-systems 118 may offer "cloud exchange services" invokable by orchestration engine 16. Sub-systems 118 and orchestration engine 116 may each be centralized or distributed applications and may execute on a management device such as one of virtual machines and/or real servers of a data center.

In accordance with the techniques described herein, orchestration engine 116 may invoke a network service orchestrator 16 to manage the deployment of VNFs identified by Decentralized Identifiers (DIDs). In the example of FIG. 2, network service orchestrator 16 may receive a request to deploy one or more virtualized network functions (e.g., virtual router) that are implemented in a virtual machine or container of cloud exchange 100, e.g., NFVi 3. Network service orchestrator 16 may request for a VNF distribution from VNF provider 14.

Network service orchestrator 16 receives a VNF distribution (e.g., VNF distribution 17 of FIG. 1) including one or more VNF images. The VNF distribution is associated with a DID. As described above with respect to the example described in FIG. 1, DIDs are based on a distributed ledger technology such as blockchain or distributed ledger 26 of consensus networks 20 and/or decentralized data store 28 (e.g., IPFS).

Network service orchestrator 16 sends the DID associated with one or more VNF images of a VNF distribution to DID resolver 18 to resolve the DID to an associated DID document stored in distributed ledgers 26 or decentralized data store 28. DID resolver 18 may look up and resolve DIDs to the associated DID document stored in distributed ledgers 26 or decentralized data store 28, and returns to network service orchestrator 16 a URL or other reference to the DID document associated with the DID. The URL or other reference may be stored in a data store, such as an identity hub (e.g., Decentralized Identity Foundation (DIF)), run by the VNF provider.

As described above, the DID document may include information for cryptographically verifying the identity of one or more VNF images associated with the DID and is used to obtain a license for deploying the VNF images implemented in a virtual machine or container of cloud exchange 100, e.g., NFVi 3. The DID document may specify public keys, authentication protocols, service endpoints, and image verifiers for the VNF images. In some examples, the DID document may include other properties, such as a proof property that is a cryptographic proof of the integrity of the DID document (e.g., that the DID document has not been tampered with).

The public key information of the DID document is used for digital signatures of VNF images, encryption and other cryptographic operations for authenticating or establishing a secure communication with service endpoints (e.g., VNF provider 14) specified in the DID document. The authentication information of the DID document is used to authenticate the DID document that is associated with the DID (e.g., to prove the controller specified in the public key information is associated with the DID). The service endpoints properties may specify the service for the entity (e.g., to obtain a license for the VNF image) and a URL or other reference to obtain a license for the VNF image. For example, the URL specified in the DID document may be a URL to a license server of VNF provider 14 to obtain a license for the VNF image. As described above with respect to the example of FIG. 1, the service endpoint property may further include an "imageVerifiers" property that is an array of VNF image verification records for one or more VNF images included in the VNF distribution. In this example, the "imageVerifiers" property includes a "publicKey" property that is used along with the "type" property to verify the digital signature of a corresponding VNF image record extracted from the VNF distribution. For example, In response to obtaining the DID document, network service orchestrator 16 may extract the VNF image record from the VNF distribution with a matching identifier (e.g., "id" property) from the "imageVerifiers" array of the DID document. Network service orchestrator 16 uses the "publicKey" property (e.g., fragment URI) that points to a public key and, with the "type" property that specifies the type of verification method (e.g., Linked Data verification method) used to calculate the image signature, may verify the corresponding VNF image of the VNF distribution. If any of the digital signatures does not match, the VNF image is bad and is reported. If the digital signature is verified, network service orchestrator 16 approves the corresponding VNF image for deployment.

If the VNF distribution is verified, network service orchestrator 16 enables the VNF images of the VNF distribution to be deployed, and network service orchestrator 16 may contact the VNF provider's license server using the URL or other reference specified in the "serviceEndpoint" property to obtain and install a license for the VNF images to be deployed in a virtual machine or container of NFVi 3 in cloud exchange 100. In this way, network service orchestrator 16 is configured to deploy VNF images as a VNF instance on NFVi 3 of cloud exchange point 128A to apply the VNF instance to traffic between the colocated networks, e.g., CSPs 110 and customers 108.

In some examples, cloud service providers 110 may include a NFVi and network service orchestrator that operate similar to the examples described in this disclosure. For example, cloud service provider 110A may include NFVi 134 that includes servers running hypervisors, on which VNF images (including the network infrastructure software) are deployed. Each of the servers may provide one or more virtual instances, such as virtual machines that provide a virtualized operating system and application suite (e.g., to deploy VNFs) for customer access. Alternatively, or additionally, each of NFVi 134 may provide containers (e.g., such as those provided by the open source Docker Container application), or other virtual execution environments in which VNFs are implemented.

In this example, network service orchestrator 132 of CSP 110A may manage the deployment of VNFs in NFVi 134. For example, network service orchestrator 132 of CSP 110A may send a DID included in a VNF distribution to DID resolver 18 to resolve the DID to an associated DID document. Network service orchestrator 132 may obtain the DID document associated with the DID and, in a similar manner as the examples described above, verify the VNF images using the DID document. A similar system may be deployed in enterprise or standalone networks (not shown in FIG. 2).

Figure 3:
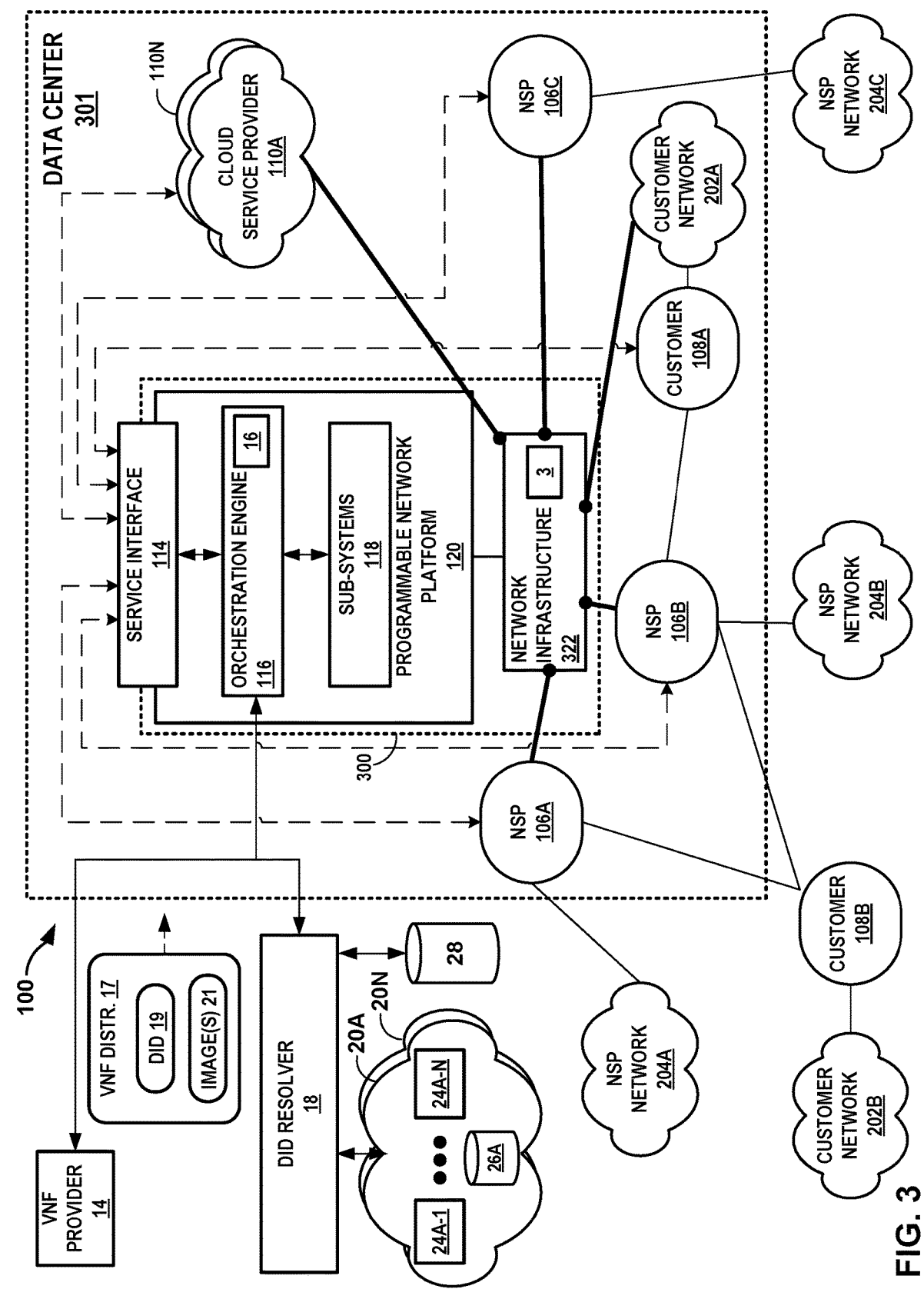
FIG. 3 is a block diagram illustrating an example data center that provides an operating environment for a cloud exchange for verifying Virtualized Network Functions using Decentralized Identifiers, in accordance with one or more aspects of the techniques described in this disclosure.

FIG. 3 is a block diagram illustrating an example data center 301 that provides an operating environment for a cloud exchange 100 for verifying Virtualized Network Functions using Decentralized Identifiers (DIDs), in accordance with one or more aspects of the techniques described in this disclosure. Cloud exchange 100 allows a corresponding one of customer networks 202A, 202B and NSP networks 204A-204C (collectively, "'NSP or 'carrier' networks 204") of any NSPs 106A-106C or other customers to be directly cross-connected, via a layer 2 (L2) or layer 3 (L3) connection to any other customer network, thereby allowing exchange of service traffic among the customer networks and CSPs 110. Data center 301 may be entirely located within a centralized area, such as a warehouse or localized data center complex, and provide power, cabling, security, and other services to NSPs, customers, and cloud service providers that locate their respective networks within the data center 301 (e.g., for colocation) and/or connect to the data center 301 by one or more external links.

Cloud exchange 100 includes network infrastructure 322 and an operating environment by which customer networks 202 may receive services from one or more CSPs 110 via interconnections. In the example of FIG. 3, network infrastructure 322 represents the switching fabric of an interconnection facility of cloud exchange 100 and includes multiple ports that may be dynamically interconnected with virtual circuits by, e.g., invoking service interface 114 of the programmable network platform 120. Each of the ports is associated with NSPs 106, customers 108, and CSPs 110. This enables an NSP customer to have options to create many-to-many interconnections with only a one-time hook up to the switching network and underlying network infrastructure 322 that presents an interconnection platform for cloud exchange 100. In other words, instead of having to establish separate connections across transit networks to access different CSPs 110, cloud exchange 100 allows a customer to interconnect to multiple CSPs 110 using network infrastructure 322 within data center 301.

An interconnection as described herein may refer to, e.g., a physical cross-connect, an Ethernet connection such as a Layer 2 VPN or virtual private LAN (e.g., E-LINE, E-LAN, E-TREE, or E-Access), an Internet exchange-based interconnection in which respective network devices (e.g., routers and/or switches) of interconnected customers directly peer and exchange layer 3 routes for service traffic exchanged via network infrastructure 322, and a cloud exchange in which customer routers peer with network infrastructure 322 (or "provider") network devices rather than directly with other customers. Cloud exchange 100 may provide, to customers, interconnection services to network services provided by CSPs 110. That is, an interconnection service by cloud exchange 100 provides access to a network service (e.g., VNF) provided by CSPs 110.

For interconnections at layer 3 or above, customers 108 may receive services directly via a layer 3 peering and physical connection to one of colocation facility exchange points or indirectly via one of NSPs 106. NSPs 106 provide "transit" by maintaining a physical presence within colocation facility 10 and aggregating layer 3 access from one or more customers 108. NSPs 106 may peer, at layer 3, directly with colocation facility 10 and in so doing offer indirect layer 3 connectivity and peering to one or more customers 108 by which customers 108 may obtain services from the cloud exchange 100.

In instances in which cloud exchange 100 offers an internet exchange, network infrastructure 322 may be assigned a different autonomous system number (ASN). Network infrastructure 322 is thus a next hop in a path vector routing protocol (e.g., BGP) path from CSPs 110 to customers 108 and/or NSPs 106. As a result, cloud exchange 100 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more CSPs 110 to customers 108. In other words, cloud exchange 100 may internalize the eBGP peering relationships that CSPs 110 and customers 108 would maintain on a pair-wise basis. Instead, a customer 108 may configure a single eBGP peering relationship with cloud exchange 100 and receive, via the cloud exchange, multiple services from one or more CSPs 110. While described herein primarily with respect to eBGP or other layer 3 routing protocol peering between colocation facility points and customer, NSP, or service provider networks, the colocation facility points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above for a cloud exchange deployment, customer network 202B in FIG. 3 is illustrated as having contracted with the cloud exchange provider for cloud exchange 100 to directly access layer 3 services via cloud exchange 100 and also to have contracted with NSP 106B to access layer 3 services via a transit network of NSP 106B. Customer network 202A is illustrated as having contracted with NSP 106B to access layer 3 services via a transit network of NSP 106B. The contracts described above may be instantiated in network infrastructure 322 of the cloud exchange 100 by L3 peering configurations within switching devices of NSPs 106 and cloud exchange 100 and L3 connections, e.g., layer 3 virtual circuits, established within cloud exchange 100 to interconnect CSPs 110 to NSPs 106 and customer networks 202, all having at least one port offering connectivity within cloud exchange 100.

In some examples, network infrastructure 322 includes one or more virtual machines or containers of NFVi 3 that is used to deploy Virtualized Network Functions. In these examples, orchestration engine 116 may invoke a network service orchestrator 16 to manage the deployment of VNFs identified by Decentralized Identifiers (DIDs). Network service orchestrator 16 may receive a request via service interface 114 to deploy one or more virtualized network functions (e.g., virtual router) that are implemented in NFVi 3 of network infrastructure 322. Network service orchestrator 16 may request a VNF distribution including one or more VNF images from a VNF provider, e.g., VNF provider 14.

Network service orchestrator 16 receives a VNF distribution 17 including one or more VNF images 21 and an associated DID 19. Network service orchestrator 16 may send DID 19 to DID resolver 18 to resolve the DID to an associated DID document that includes information for cryptographically verifying the identity of VNF images 21 associated with the DID and is used to obtain a license for deploying VNF images 21 as a VNF instance on NFVi 3 in network infrastructure 322. As described above, the DID document is cryptographically verifiable and resides in cryptographically secure, distributed ledgers, e.g., distributed ledger 26A (e.g., blockchain) and/or decentralized, content-addressable data store 28 (e.g., IPFS). DID resolver 18 may look up and resolve the DID to the associated DID document from distributed ledgers 26, and returns to network service orchestrator 16 a URL or other reference pointing to a DID document associated with the DID. In some examples, the URL or other reference is stored in a data store, such as an identity hub (e.g., Decentralized Identity Foundation (DIF)), run by the VNF provider, e.g., CSP 110A. Network service orchestrator 16 verifies the DID document using the image verification information included in the DID document, and if verified, obtains and installs a license (e.g., from a network address to a license server of VNF provider 14) to deploy the VNF images on NFVi 3 in network infrastructure 322.

Figure 4:
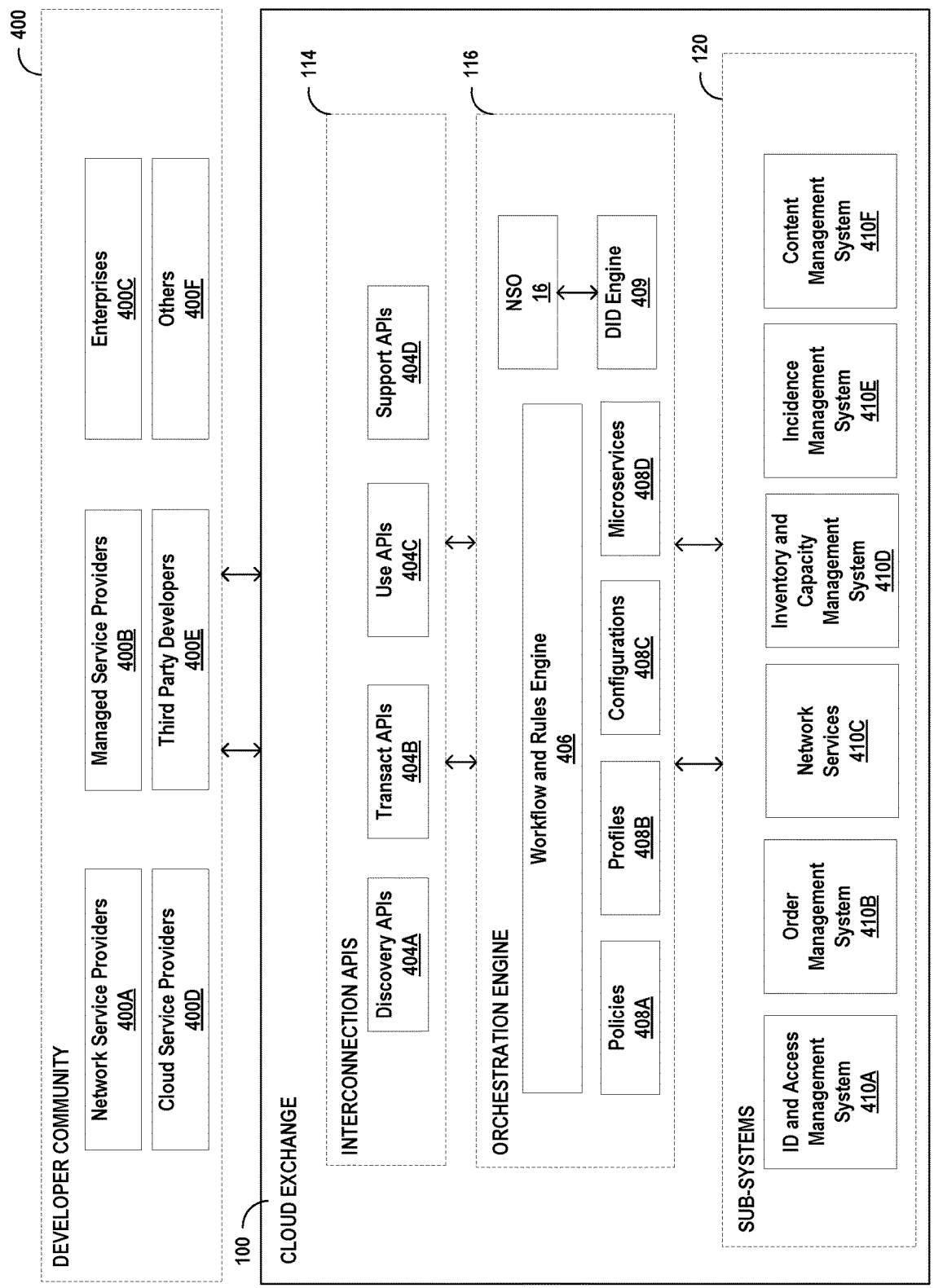
FIG. 4 is a block diagram that illustrates details of an example architecture for a cloud exchange in further detail, in accordance with one or more aspects of the techniques described herein.

FIG. 4 is a block diagram that illustrates details of an example architecture for a cloud exchange in further detail, in accordance with one or more aspects of the techniques described herein. As shown in this example, example cloud exchange 100 illustrates service interface 114, orchestration engine 116, and sub-systems 118 in further detail.

Developer community 400 illustrates entities that may develop applications that use service interface 114 (e.g., APIs) to access the interconnection platform of the cloud exchange 100. These entities include network service providers 400A, managed service providers 400B, enterprises 400C, cloud service providers 400D, third-party developers 400E, and others 400F. Applications developed by these entities utilize cloud exchange 100 as an interconnection platform for interconnecting customers to cloud services offered by cloud services providers according to the policies and profiles of the various entities.

In this example, service interface 114 includes bundles of the various API methods or endpoints according to function. Discovery APIs 404A may be usable to perform availability of location discovery, asset discovery, and cloud service discovery. Discoverable information may include available metropolitan areas, data centers, ports, services, virtual circuits, and other interconnection assets (e.g., VNFs) by which a customer may obtain or manage cloud services. Transact APIs 404B may be usable to dynamically provision end-to-end virtual circuits of varying bandwidths through machine-to-machine interaction, validate virtual circuits requested by a customer, and confirm deletion of virtual circuits, for example. Use APIs 404C may be usable to allow providers and customers to dynamically obtain recommendation information as performed by a recommendation engine of cloud exchange 100, obtain customized analytics regarding competitor presence, cloud service presence/availability, and customer presence/availability, obtain usage statistics, and to manage content, for example. Support APIs 404D may be usable by customers or providers to manage accounts, perform automated billing/invoicing, validate credit, and configure profile and configuration information for the entity, for example.

In this example, orchestration engine 116 organizes, directs, and integrates underlying software and network sub-systems 118 for managing various aspects of interconnection and deployment of VNFs. For example, orchestration engine 116 may handle the entire quote-to-cash cycle for provisioning of interconnection assets (e.g., VNFs) by communicating with myriad interconnection enablement sub-systems 118, such as Customer Account and Profile Management Systems, Customer Asset Management Systems, Inventory Management Systems, Capacity Management Systems, Network Systems, Credit Management Systems, Content Management Systems, and Trouble Ticket Management System (not all shown in FIG. 4). To that end, orchestration engine 116 includes a workflow and rules engine 406 that responsively operates according to configured exchange policies 408A, profiles 408B, and configurations 408C to synthesize information and actions from sub-systems 118 to formulate intelligent next steps and responses to requests received via service interface 114. Micro-services component 408D componentizes many, and in some cases all, of the interconnection services to improve horizontal scalability, performance efficiency, and low-to-zero down-time feature upgrades and enhancements. In this way, orchestration engine 116 may abstract the complexity of underlying software and sub-systems 118 by providing a uniform, simplified and secured means to access the interconnection platform for accessing and managing interconnection assets. Orchestration engine 116 includes a network service orchestrator 16 that executes a DID engine 409 to manage the deployment of one or more VNF images verified using DIDs, in accordance with the techniques described in this disclosure. DID engine 409 may perform the verification of one or more VNF images based on a DID document associated with the DID, in accordance with the techniques described in this disclosure. In this example, network service orchestrator 16 may be an example instance of network service orchestrator 16 described in FIGS. 1-3.

Sub-systems 118 orchestrated by orchestration engine 116 in the example of FIG. 4 include identification (ID) and access management system 410A. In some examples, ID and access management system 410A includes a Permission Data Store (PDS) to house the customer, asset and permission hierarchy. ID and access management system 410A may accomplish federation using a third party system which generates Security Assertion Markup Language (SAML) assertions and is also capable of providing Single Sign-On (SSO) capability.

Orchestration engine 116 may orchestrate multiple order management systems 410B (e.g., for different regions such as Asia Pacific, Europe, Middle East and Africa and North America). Orchestration engine 116 passes relevant virtual circuit and/or VNF order creation information to these order management systems 410B so that the partners can be billed. Orchestration engine 116 may abstract the complexity of the underlying network systems by seamlessly integrating with the network services system 410C to interact with the underlying network systems. Orchestration engine 116 may leverage an asset inventory and capacity management system 410D in conjunction with the Permission Data Store to obtain information about customer ports inventory. Orchestration engine 116 may leverage this information to place virtual circuit requests against the appropriate ports. Asset inventory and capacity management system 410D may be used to evaluate the available bandwidth on each port before provisioning of the virtual circuits.

Orchestration engine 116 accepts incident requests from partners and customers and communicates with the underlying incident management system 410E to raise service tickets. Orchestration engine 116 communicates with the content management system 410F to, e.g., render internationalized and localized content for a customer based on the language preference of the customer. Content management system 410F aids in transparent translation of all labels, error messages, success messages and responses displayed on the web portal, mobile devices or in machine-to-machine communication via service interface 114.

Figure 5:
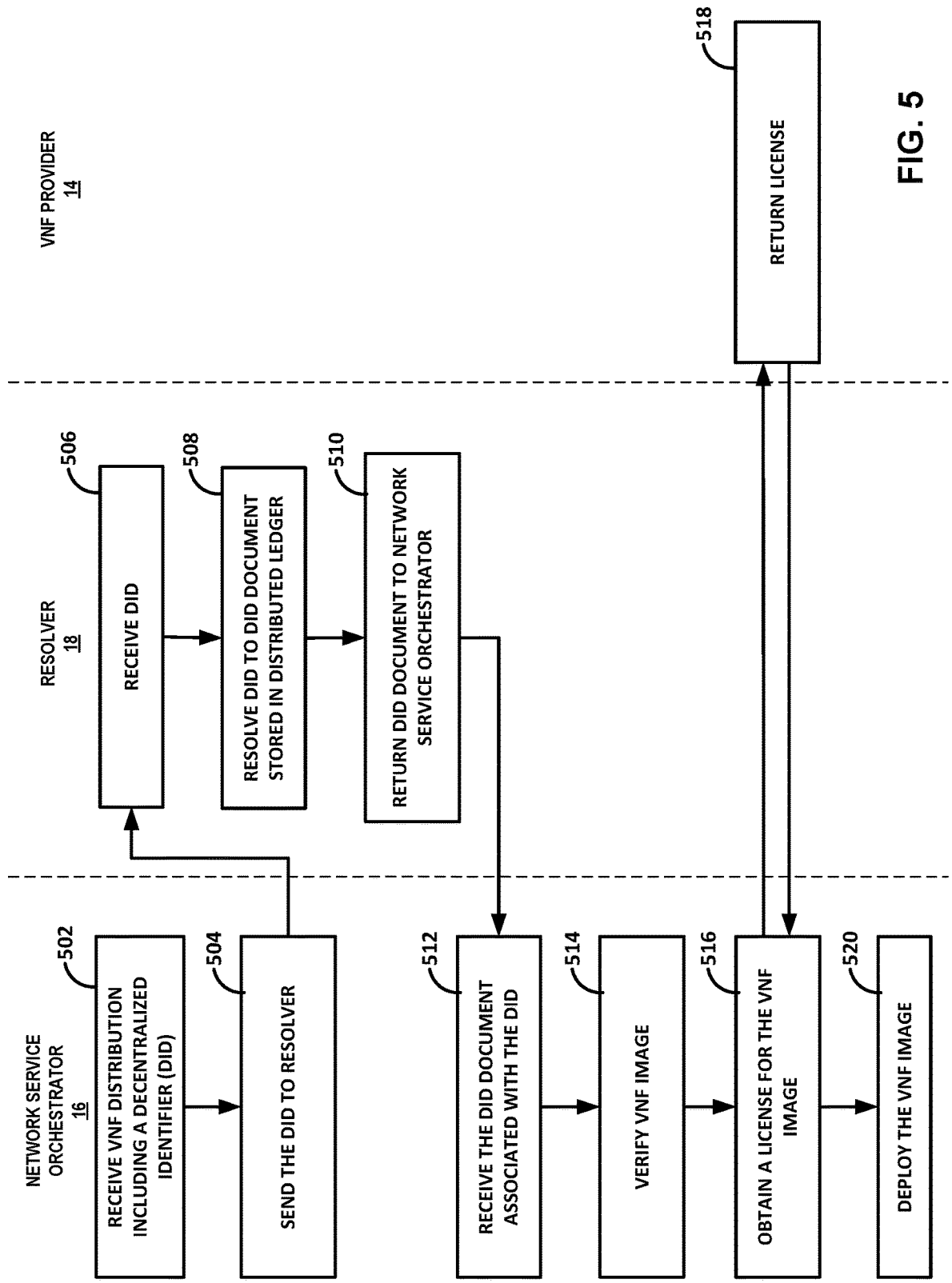
FIG. 5 is a flowchart illustrating an example operation of a system that provides verifying Virtualized Network Functions using Decentralized Identifiers, in accordance with one or more aspects of the techniques described in this disclosure.

FIG. 5 is a flowchart illustrating an example operation of a system for verifying Virtualized Network Functions using Decentralized Identifiers, in accordance with one or more aspects of the techniques described in this disclosure.

In the example of FIG. 5, network service orchestrator 16 receives a VNF distribution including a decentralized identifier (DID) (502). Network service orchestrator 16 obtains a DID document associated with the DID using the DID that is associated with a VNF image from the VFN distribution. For example, network service orchestrator 16 sends the DID to DID resolver 18 (504). Resolver 18 receives the DID (506) and resolves the DID to the DID document associated with the DID (508). For example, DID resolver 18 includes plug-ins (e.g., DID drivers) to lookup and resolve DIDs to associated DID documents stored in distributed ledgers 26 or content-addressable data store 28. In some examples, DID resolver 18 may return a URL or other reference to a DID document.

DID resolver 18 returns the DID document (or in this example, a URL to the DID document) to network service orchestrator 16 (510). Network service orchestrator 16 receives the DID document associated with the DID (512) and verifies the VNF image based on the DID document associated with the DID (514). As further described below with respect to the example described in FIG. 6, network service orchestrator 16 examines information contained in the DID document that is used to cryptographically verify the integrity of the VNF image or VNF instance identified by the DID. If verified, network service orchestrator 16 verifies the VNF image for deployment.

In response to verifying the VNF image for deployment, network service orchestrator 16 obtains a license for deploying the VNF image (516). For example, network service orchestrator 16 obtains a license for deploying the VNF image via a URL (e.g., to a service location such as a VNF provider) in the DID document that can be used to obtain a license for the VNF image. The service provider, e.g., VNF provider 14, returns a license for the VNF image (518). Using the license obtained from VNF provider 14, network service orchestrator 16 deploys the VNF image (520).

Figure 6:
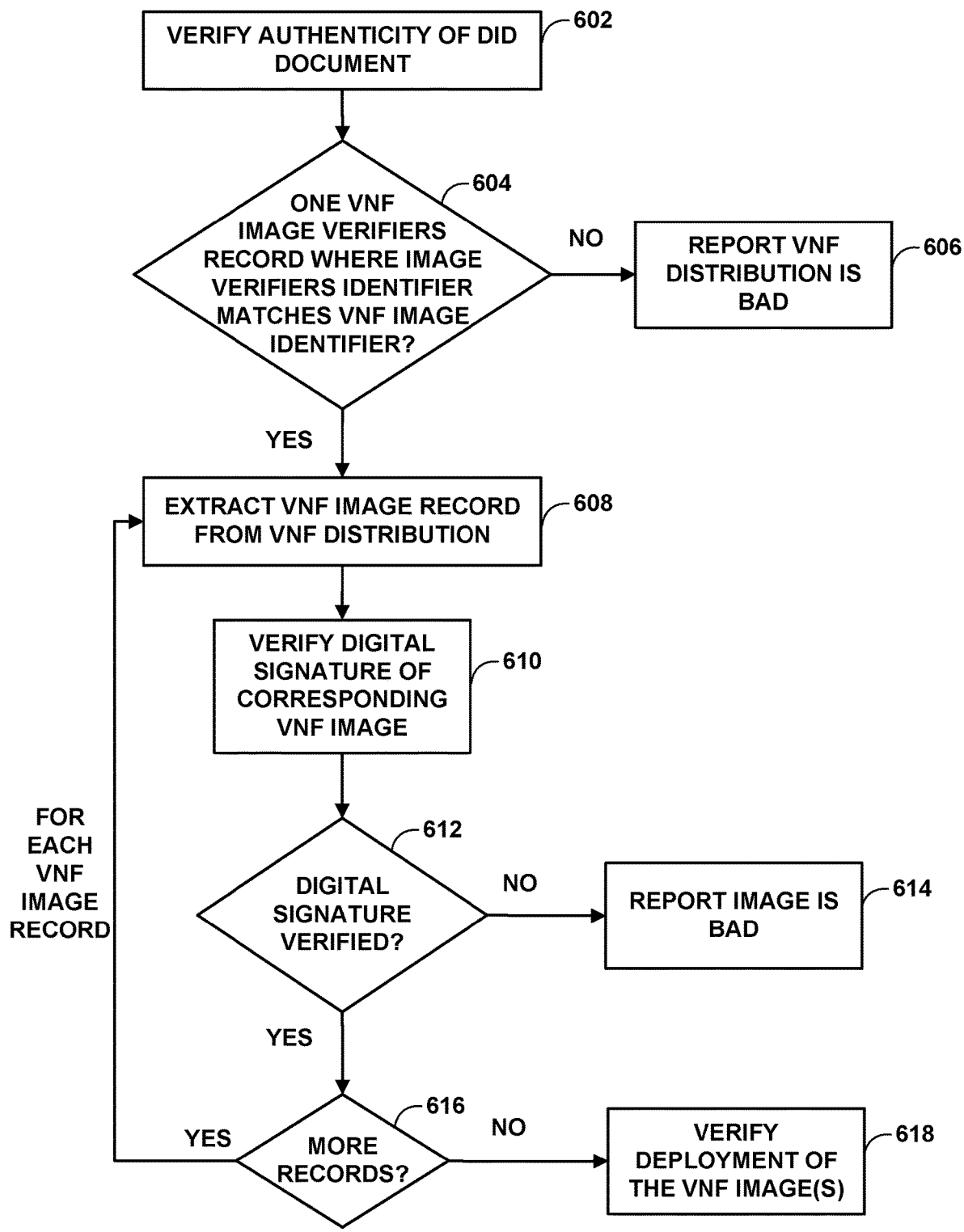
FIG. 6 is a flowchart illustrating an example operation of a system for verifying Virtualized Network Functions using Decentralized Identifiers in further detail, in accordance with one or more aspects of the techniques described in this disclosure.

FIG. 6 is a flowchart illustrating an example operation of a system for verifying Virtualized Network Functions using Decentralized Identifiers in further detail, in accordance with one or more aspects of the techniques described in this disclosure.

When network service orchestrator 16 obtains the DID document associated with the DID, network service orchestrator 16 verifies the authenticity of the DID document (602). For example, the DID document includes a proof property that is a cryptographic proof of the integrity of the DID document (e.g., that the DID document has not been tampered with). For example, network service orchestrator 16 may authenticate the DID document using the type property specifying the type of proof mechanism (e.g., Linked Data Signatures), a timestamp of when the DID document was created (e.g., created property), a creator property specifying the public key used to verify the signature, and a digital signature of the DID document (e.g., signatureValue property).

In response to verifying the authenticity of the DID document, network service orchestrator 16 may determine if the VNF distribution is bad. For example, network service orchestrator 16 may determine whether there is exactly one "imageVerifiers" record in the DID document, where the image verifiers identifier (e.g. id property of "imageVerifiers" record) matches the VNF image identifier (e.g. id property of VNF image record of VNF distribution 17) (604). If the identifiers do not match ("NO" branch of 604), then the VNF distribution is bad and is reported (606).

If there is at least one matching identifier ("YES" branch of 604), network service orchestrator 16 checks each VNF image record in VNF distribution 17 whether the VNF images are bad. For example, network service orchestrator 16 extracts a corresponding VNF image record with a matching identifier (e.g., id property) from an "imageVerifiers" array of the DID document (608) and uses the signature algorithm (e.g., as specified in the "type" property of the "imageVerifiers" record and the public key pointed by the fragment URI in the "publicKey" property from the "imageVerifiers" record to verify the digital signature of the corresponding VNF image in the VNF distribution (610). If the digital signature does not verify ("NO" branch of 6612), network service orchestrator 16 reports the corresponding VNF image as bad (614). If the digital signature is verified ("YES" branch of 612), network service orchestrator 16 determines whether there are additional records to process (616). If there are more records to process ("YES" branch of 616), network service orchestrator 16 repeats the process to verify each VNF image of the VNF distribution using the signature algorithm (e.g., as specified in the "type" property of the "imageVerifiers" record and the public key pointed by the fragment URI in the "publicKey" property from the "imageVerifiers" record) to verify the digital signature of the remaining VNF image records in the VNF distribution. If there are no additional records to process ("NO" branch of 616), network service orchestrator 16 determines the VNF image(s) are verified for deployment (618).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
an orchestrator configured to:
obtain, using a Decentralized Identifier (DID) that is associated with a virtualized network function (VNF) image for a VNF, a DID document associated with the DID,
verify, based on the DID document associated with the DID, the VNF image, wherein the DID document comprises information for cryptographically verifying the VNF image; and
deploy, in response to verifying the VNF image, the VNF image as a VNF instance on a Network Functions Virtualization infrastructure (NFVi); and
the NFVi, wherein the NFVi comprises one or more computing devices to implement the VNF image.

2. The system of claim 1, wherein the orchestrator is further configured to:
obtain, based on the DID document, a license for the VNF image.

3. The system of claim 2,
wherein the DID document comprises a service location, and
wherein to obtain the license for the VNF image, the orchestrator is configured to send a license request to the service location.

4. The system of claim 1, wherein the orchestrator is further configured to:
receive a VNF distribution, wherein the VNF distribution comprises the DID for the VNF distribution, and a plurality of VNF images including the VNF image,
wherein the DID document comprises a corresponding VNF image identifier record for each of the plurality of VNF images of the VNF distribution.

5. The system of claim 4, wherein the corresponding VNF image verifier record for each of the plurality of VNF images further comprises information for cryptographically verifying a corresponding VNF image, the information comprising:
an image verifier identifier for the corresponding VNF image verifier record;
a type of verification method used to compute an image signature for the corresponding VNF image of the plurality of VNF images;
a public key used to verify the image signature for the corresponding VNF image; and
the image signature that is a hash of the corresponding VNF image in the VNF distribution that is encrypted with a private key specified by the type of verification method.

6. The system of claim 5, wherein the image verifier identifier for the corresponding VNF image verifier record comprises:
a Uniform Resource Identifier (URI) specifying the DID; and
a fragment identifier specifying the image signature for the corresponding VNF image and an index of the corresponding VNF image verifier record in an array of VNF image verifier records for the plurality of VNF images.

7. The system of claim 5, wherein, to verify each of the plurality of VNF images, the orchestrator is further configured to:
determine whether the image verifier identifier for the corresponding VNF image verifier record of the DID document matches an identifier of a corresponding VNF image of the plurality of VNF images of the VNF distribution;
in response to determining the image verifier identifier matches the identifier of the corresponding VNF image of the plurality of VNF images of the VNF distribution, determine, using the type of verification method and the public key of the corresponding VNF image verifier record, whether a digital signature of the corresponding VNF image of the plurality of VNF images of the VNF distribution is verified; and
in response to verifying the digital signature of the corresponding VNF image, deploy the corresponding VNF image as a corresponding VNF instance on the NFVi.

8. The system of claim 1, wherein the orchestrator is further configured to:
verify authenticity of the DID document using a proof property of the DID document.

9. The system of claim 1, further comprising:
a cloud exchange comprising the NFVi;
one or more colocated networks;
wherein, to deploy the VNF image as the VNF instance on the NFVi, the orchestrator is configured to deploy the VNF image as the VNF instance on the NFVi to apply the VNF instance to exchange network traffic between the colocated networks interconnected with the cloud exchange.

10. A method comprising:
obtaining, by an orchestrator using a Decentralized Identifier (DID) that is associated with a virtualized network function (VNF) image for a VNF, a DID document associated with the DID, wherein the DID document is stored in a distributed ledger of one or more consensus networks;
verifying, by the orchestrator and based on the DID document associated with the DID, the VNF image, wherein the DID document comprises information for cryptographically verifying the VNF image; and
deploying, in response to verifying the VNF image, the VNF image as a VNF instance on a Network Functions Virtualization infrastructure (NFVi).

11. The method of claim 10, further comprising:
obtaining, by the orchestrator and based on the DID document, a license for the VNF image.

12. The method of claim 11,
wherein the DID document comprises a service location, and
wherein obtaining the license for the VNF image comprises sending a license request to the service location.

13. The method of claim 10, further comprising:
receiving, by the orchestrator, a VNF distribution, wherein the VNF distribution comprises the DID for the VNF distribution and a plurality of VNF images including the VNF image, wherein the DID document comprises a corresponding VNF image identifier record for each of the plurality of VNF images of the VNF distribution.

14. The method of claim 13, wherein the corresponding VNF image verifier record for each of the plurality of VNF images of the VNF distribution comprises information for cryptographically verifying a corresponding VNF image, the information comprising:
an image verifier identifier for the corresponding VNF verifier record;
a type of verification method used to compute an image signature for the corresponding VNF image of the plurality of VNF images;
a public key used to verify the image signature for the corresponding VNF image; and
the image signature that is a hash of the corresponding VNF image in the VNF distribution that is encrypted with a private key specified by the type of verification method.

15. The method of claim 14, wherein the image verifier identifier for the corresponding VNF image verifier record comprises:
a Uniform Resource identifier (URI) specifying the DID; and
a fragment identifier specifying the image signature for the corresponding VNF image and an index of the corresponding VNF image verifier record in an array of VNF image verifier records for the plurality of VNF images.

16. The method of claim 14, wherein verifying each of the plurality of VNF images comprises:
determining, by the orchestrator, whether the image verifier identifier of the corresponding VNF image verifier of the DID document matches an identifier of a corresponding VNF image of the plurality of VNF images of the VNF distribution;
in response to determining the image verifier identifier matches the identifier of the corresponding VNF image of the plurality of VNF images of the VNF distribution, determining, by the orchestrator, using the type of verification method and the public key of the corresponding VNF image verifier record, whether a digital signature of the corresponding VNF image of the plurality of VNF images of the VNF distribution is verified; and
in response to verifying the digital signature of the corresponding VNF image, deploying, by the orchestrator, the corresponding VNF image as a corresponding VNF instance on the NFVi.

17. The method of claim 10, further comprising:
verifying, by the orchestrator, authenticity of the DID document using a proof property of the DID document.

18. The method of claim 10, further comprising:
deploying, by the orchestrator, the VNF image as the VNF instance on a NFVi of a cloud exchange to apply the VNF instance to exchange network traffic between colocated networks interconnected with the cloud exchange.

19. A device configured to operate as an orchestrator comprising:
a memory; and
processing circuitry in communication with the memory, the processing circuitry being configured to:
obtain, using a Decentralized Identifier (DID) that is associated with a Virtualized Network Function (VNF) image for a VNF, a DID document associated with the DID, wherein the DID document is stored in a distributed ledger of one or more consensus networks;
verify, based on the DID document associated with the DID, the VNF image, wherein the DID document comprises information for cryptographically verifying the VNF image; and
deploy, in response to verifying the VNF image, the VNF image as a VNF instance on a Network Functions Virtualization infrastructure (NFVi).

20. The device of claim 19, wherein the processing circuitry is further configured to:
receive a VNF distribution, wherein the VNF distribution comprises the DID for the VNF distribution and a plurality of VNF images including the VNF image, wherein the DID document comprises a corresponding VNF image identifier for each of the plurality of VNF images of the VNF distribution.

* * * * *